Aug. 30, 1966    M. J. LUGASH    3,269,567
VEHICLE LOADERS AND REINFORCING MECHANISM
FOR VEHICLE BED PLATES
Filed Nov. 23, 1964    4 Sheets-Sheet 1
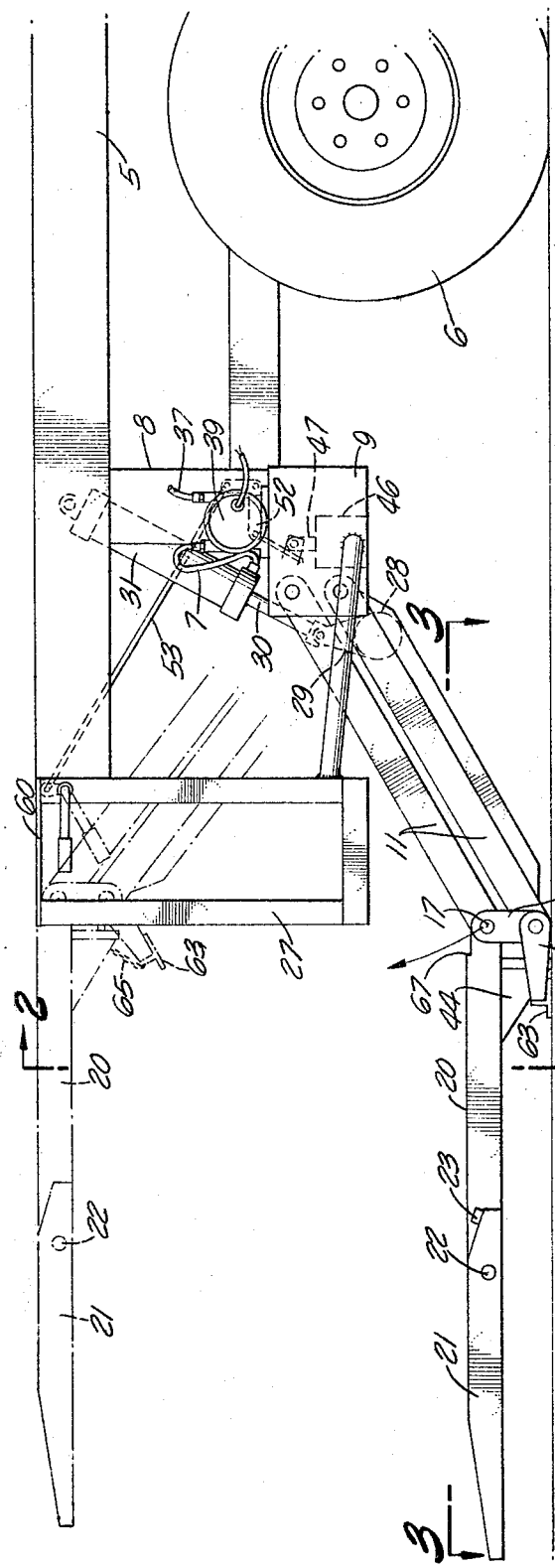
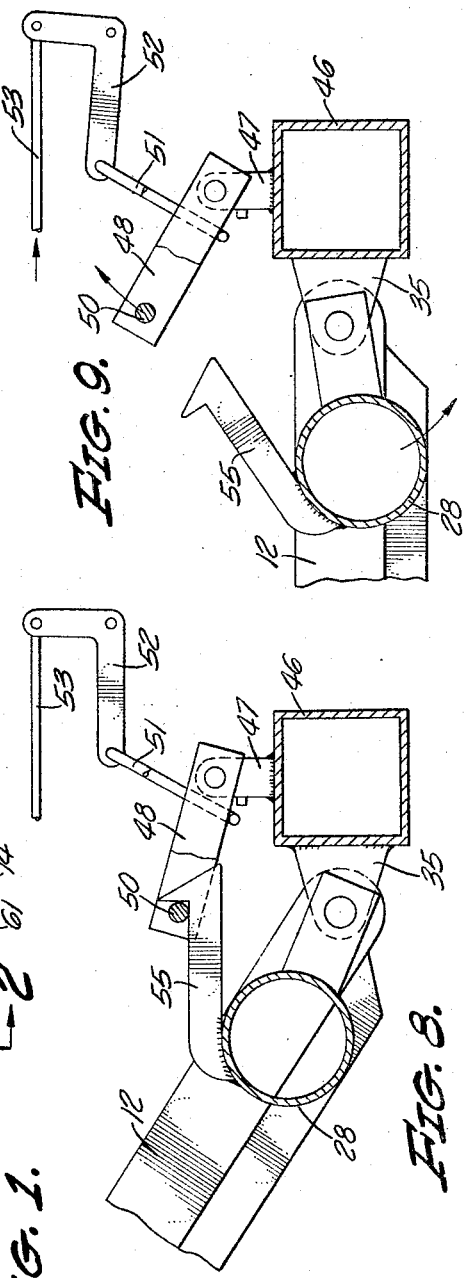
INVENTOR.
MAX J. LUGASH
BY
ATTORNEY

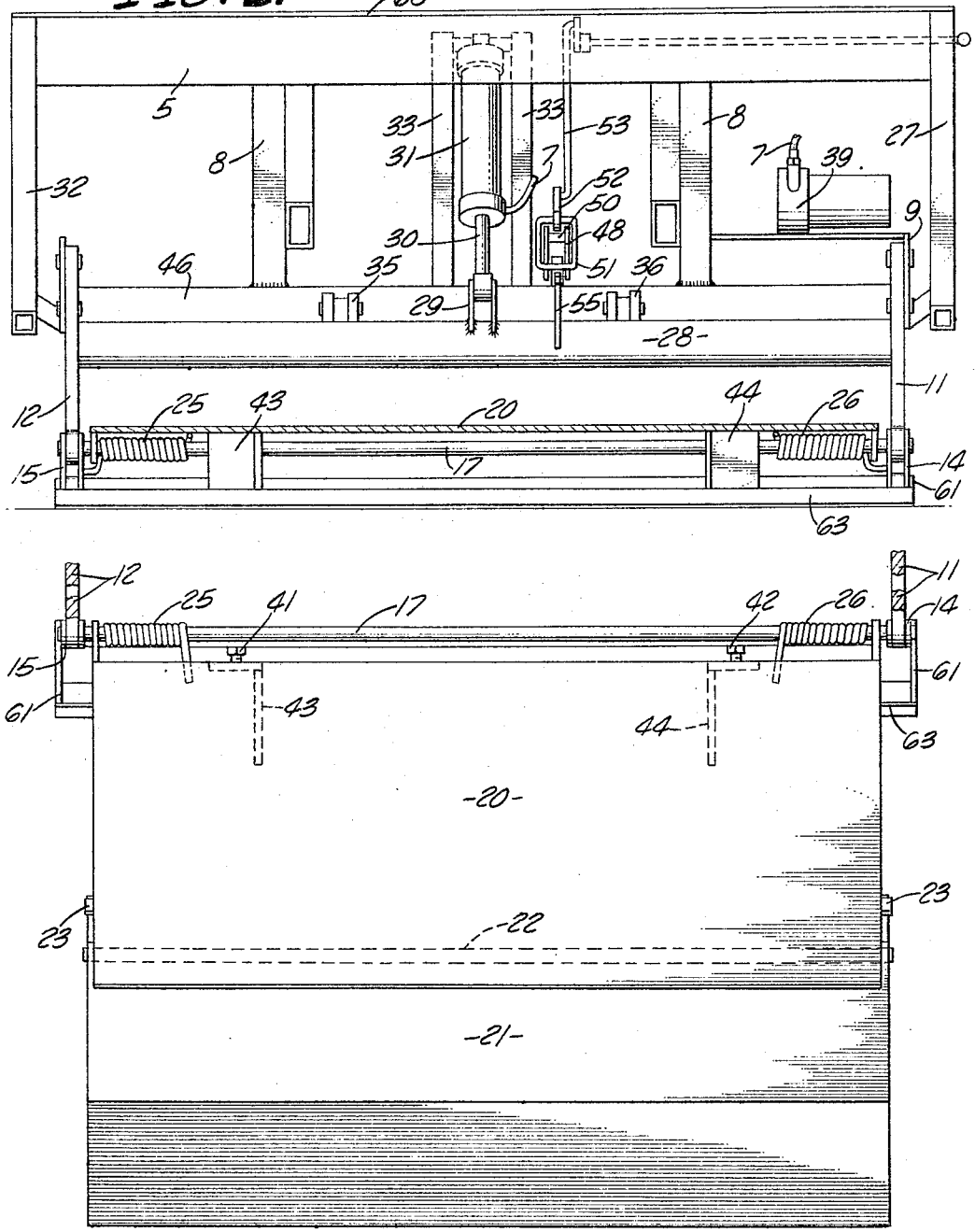

INVENTOR.
MAX J. LUGASH
BY
ATTORNEY

INVENTOR.
MAX J. LUGASH
BY
ATTORNEY

United States Patent Office
3,269,567
Patented August 30, 1966

1

3,269,567
VEHICLE LOADERS AND REINFORCING MECHANISM FOR VEHICLE BED PLATES
Max J. Lugash, Los Angeles, Calif., assignor to Maxon Industries, Inc., Vernon, Calif., a corporation of California
Filed Nov. 23, 1964, Ser. No. 413,086
9 Claims. (Cl. 214—77)

This invention relates to loading mechanisms attached to the rear of transporting vehicles, such as trucks, and particularly to mechanisms for reinforcing the bed plate extensions when the vehicles are loaded either with the loading mechanism attached to the vehicle or from a fixed platform or dock.

In my Patents Nos. 2,837,227 and 2,989,196, I disclose and claim a hoisting mechanism for loading vehicles, such as trucks, from the rear. It is well known that many trucks have a bed extension from the rear end thereof which is used primarily when the vehicle is backed up to a fixed loading platform or dock. The present mechanism is of the general type which may be folded under the rear end of the vehicle, as shown in the above-mentioned patents.

It was found in the use of these mechanisms that a support for the rear end extension of the bed plate of the vehicles was desirable to prevent the deformation or bending of the bed plate extension, particularly when heavy fork lift devices were used to load the vehicles. The present invention is directed to a foldable hoisting mechanism adapted to not only support the rear bed plate extension when the hoisting mechanism is used, but also to provide a support when the hoisting mechanism is folded under the rear end of the truck and loading is accomplished directly from a fixed loading platform or dock at approximately the same height as the truck bed. The support also provides safety for operators by preventing any drop of heavy fork lift devices.

The principal object of the invention, therefore, is to facilitate the loading and unloading of vehicles such as trucks with safety to the mechanism and operators.

A further object of the invention is to provide an improved hoisting mechanism for vehicles which provides support for a truck bed extension at all times.

A further object of the invention is to provide a loading mechanism for the rear ends of trucks which provides support for the truck bed extension when the loading mechanism is functioning and when the loading mechanism is folded under the truck.

Figure 4:
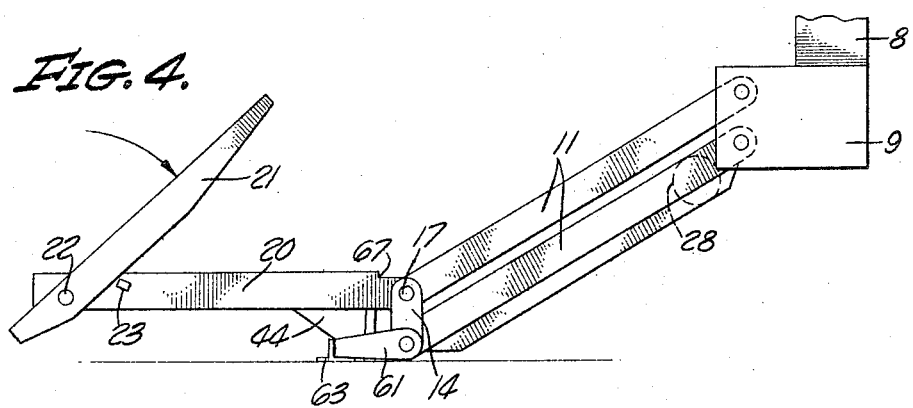
Figure 5:
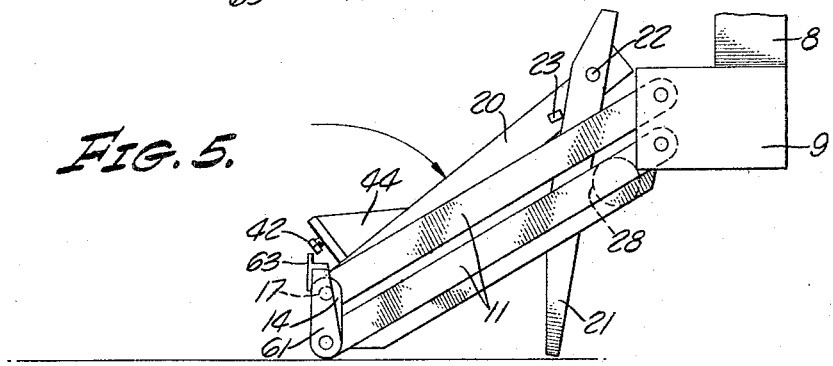
Figure 6:
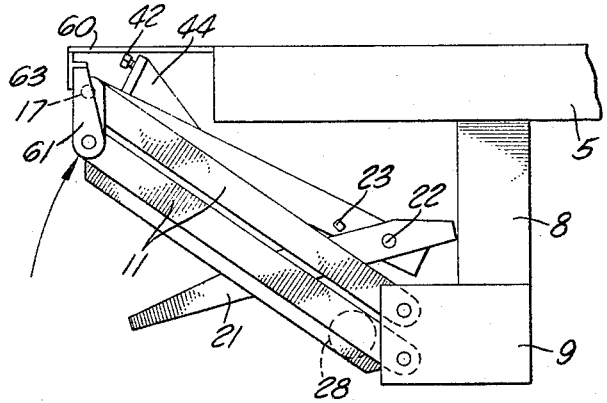
Figure 7:
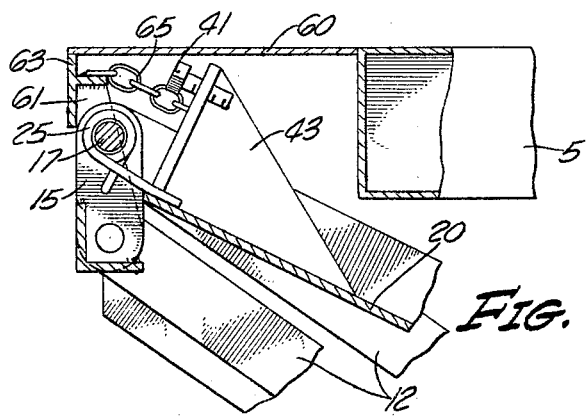
Figure 10A:
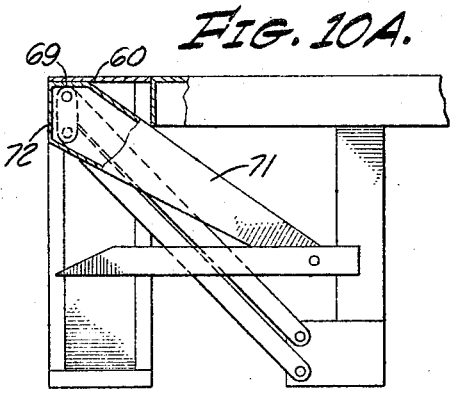
Figure 10B:
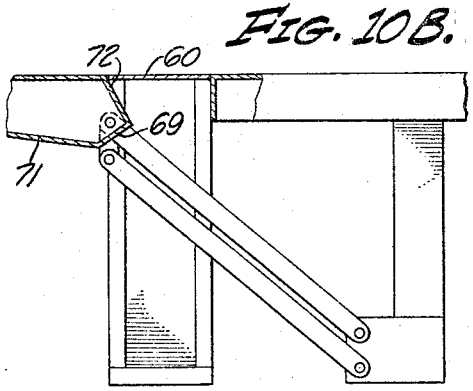
Figure 11A:
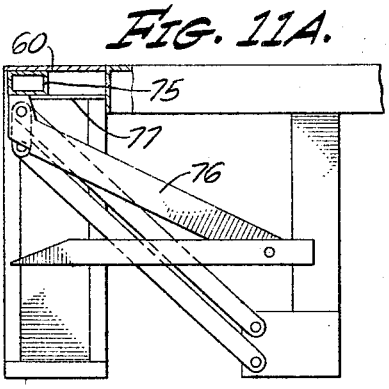
Figure 11B:
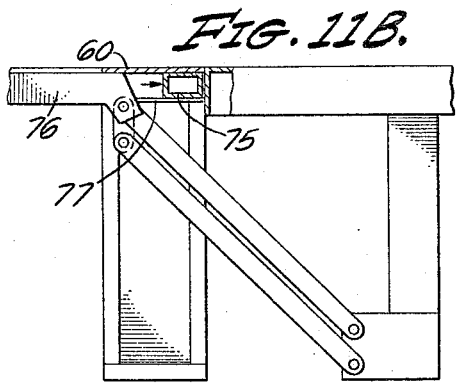

A better understanding of this invention will be had from the following detailed description when read in connection with the accompanying drawings, in which:

FIG. 1 is a side elevational view of a loading mechanism embodying the invention;
FIG. 2 is the rear view taken along the line 2—2 of FIG. 1;
FIG. 3 is a plan view of the lift platform taken along the line 3—3 of FIG. 1;
FIG. 4 is a fragmentary side elevational view of the initial step in folding the platform;
FIG. 5 is a fragmentary view with the platform partially folded;
FIG. 6 is a view similar to FIG. 5 showing the folded platform in its raised position;
FIG. 7 is an enlarged fragmentary section showing a vehicle bed extension and its support member;
FIGS. 8 and 9 are fragmentary sectional views of the safety latch of the lift mechanism;
FIGS. 10-A and 10-B are views of a modification of the extension support;
FIGS. 11-A and 11-B are views of another modification of the extension support; and

2

Figure 12A:
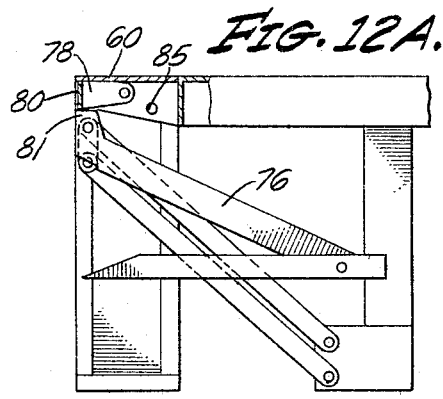
Figure 12B:
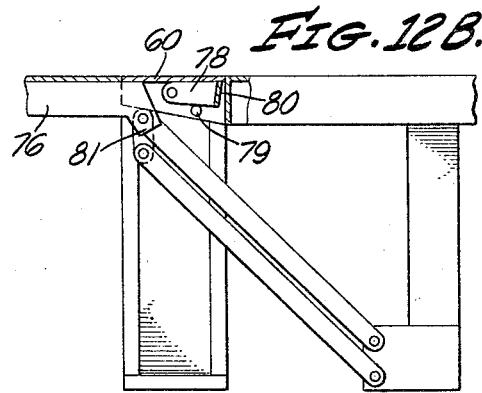

FIGS. 12-A and 12-B are views of a further modification of the extension support.

Referring, now, to the drawings in which the same reference numeral is applied to the same element, a truck having a frame 5 and wheels, one of which is shown at 6, has attached thereto a pair of depending members 8 supporting members 9. Pivotally attached to the members 9 are two pairs of parallel arms 11 and 12, the other ends of the arms being pivotally attached to links 14 and 15, the links 14 and 15 being interconnected by a rod 17 and which supports the rear end of the portion 20 of a hoisting or lifting platform, the platform having a front section 21 pivoted on a rod 22 and which is limited in its anticlockwise rotation by stops 23.

This construction of the platform permits the portion 21 to be folded over the portion 20 and then the two portions folded over as shown in FIGS. 4 and 5. Coil springs 25 and 26 aid in the folding operation. Guard frames 27 and 32 are positioned on each side of the loader and attached to the end of the truck bed to serve as a bumper to protect the loading mechanism.

Connected between the two lower arms 11 and 12 is a tube 28 to which is welded a bracket 29 to which is pivoted a piston 30 in a hydraulic cylinder 31, the closed end of the cylinder being pivoted on a pin between the ends of support members 33 which are connected between square tube 46 and brace members not shown. The tube 28 is pivoted on bosses 35 and 36 so that when hydraulic fluid under pressure is supplied to the cylinder 31 over a hose 7, the tube 28 will be rotated and raised, which raises the entire platform and supporting frame to the position shown in FIG. 6. When the valve, not shown, in tube 37 is opened, the platform and its frame will lower with gravity, the hydraulic fluid being returned to the pump 39 (see FIG. 1). To adjust the angular position of the platform when in its lowered position, a pair of set screws 41 and 42 are positioned between rod 17 and brackets 43 and 44, respectively, attached to the platform section 20.

The square tube 46 connected between members 9 has an ear 47 to which is pivoted an arm 48 having a pin 50 at the end thereof. The arm 48 has a yoke 51 attached to a crank arm 52 adapted to be actuated by a control rod 53. The tube 28 has welded thereto a hook or latch 55 which in locking position has its notched end abutting pin 50, as shown in FIG. 8. Thus, the loading platform and its frame are locked in its raised position when not in use, such as during movement of the vehicle. When it is desired to lower the platform, the platform is slightly raised so that the rod 53 may be actuated to remove the pin 50 from the latch 55. The positioning of the hook and pin prevents the unlocking of the hook and pin by vibration during travel.

As mentioned above, an important feature of the invention is the support for the overhanging extension 60 of the truck frame 5, the rear edge thereof being adapted to contact a fixed loading platform of substantially the same height. As shown in FIG. 1, an arm 61 on the lower pivot point of the lower parallel arms 11 and 12 has welded thereto a T-bar 63, this T-bar being welded to a link of chains 65 attached to the brackets 43 and 44. Thus, when the platform is lowered to the position shown in full lines in FIG. 1, the flat surface of the top portion of the T-bar rests on the ground but when the mechanism is folded under the truck and raised, as shown in FIGS. 6 and 7, the edge of the top portion of the T-bar contacts the under surface portion of the outer edge of the extension 60. This position of the T-bar provides the greatest amount of support for the overhanging end of the extension 60 so that when heavy loads are moved over the extension 60, they will not bend or deform the extension. Furthermore, when such a vehicle is backed into a fixed loading platform or dock, the T-bar 63 prevents damage to the extension 60. When the loading mechanism is in use and is in its raised position, the overhanging end of extension 60 is accommodated in the notch 67 of the portion 20 of the platform. Thus, the extension 60 is supported during both modes of operation.

Referring, now, to FIGS. 10–A and 10–B, a modification of the support of extension 60 is provided by shaping the rear edge of the portion 71 of the loading platform so that when the loading mechanism is folded under the vehicle, the portion 69 of the portion 71 contacts the outer portion of extension 60. During the functioning of the loading mechanism, the edge of the extension 60 contacts the portion 72 of the platform, as shown in FIG. 10–B.

In FIGS. 11–A and 11–B, a rectangular tube 75 is adjustable from the position under the rear portion of extension 60, as shown in FIG. 11–A, when the platform 76 is folded to the position shown in FIG. 11–B when the platform is in use and in raised position. The rectangular tube is contained within a housing 77 on frame 27. When the loading platform is in raised operative position, the rear end of section 76 is positioned under the end portion of the extension 60 to provide the necessary support for the extension.

In FIGS. 12–A and 12–B, a third modification of the extension support is shown, this support having the same platform as shown in FIGS. 11–A and 11–B but utilizing a pivotal arm 78 which, when the loading platform is folded, has its front side 80 between the outer edge of extension 60 and the portion 81 of the platform 76. When the loading platform is in use and in a raised position, a portion of the platform 76 extends under the extension 60 and the arm 78 is rotated out of position and held therein by a pin 79 which may be inserted in the hole 85, as shown in FIG. 12–B.

As mentioned above, the hydraulic hoisting or loading mechanism is provided with a construction which supports the outer edge of the bed plate extension to prevent damage to the extension and loading mechanism and provide safety of operation for operators loading heavy loads.

I claim:

1. In a loader for vehicles, the combination of a frame depending from the rear of a vehicle, said vehicle having a rectangular bed plate extension from the rear of said vehicle, a platform adapted to be raised to the surface of said bed plate extension, lowered to the ground and folded under said bed plate extension, means associated with said platform for supporting the under surface of the outer edge portion of said bed plate extension when said platform is raised to the surface of said bed plate extension and means attached to said platform to support the entire length of the outer edge of said extension when said platform is folded under said bed plate extension.

2. In a loader for vehicles, the combination of a frame depending from the rear of a vehicle, said vehicle having a bed plate extension from the rear of said vehicle, a platform adapted to be raised to the surface of said bed plate extension, lowered to the ground and folded under said bed plate extension, means for supporting said bed plate extension when said platform is raised to the surface of said bed plate extension and when said platform is folded under said bed plate extension, said means including a bar extending transversely of said platform, means for rotatably attaching said bar to said platform, said bar contacting the under surface of the outer edge of said bed plate extension when said platform is folded under said extension.

3. In a loader for vehicles, the combination of a frame depending from the rear of a vehicle, said vehicle having a bed plate extension from the rear of said vehicle, a platform adapted to be raised to the surface of said bed plate extension, lowered to the ground and folded under said bed plate extension, means for supporting said bed plate extension when said platform is raised to the surface of said bed plate extension and when said platform is folded under said bed plate extension, one end of said platform being adapted to contact the entire under surface of the outer edge of said extension when said platform is in raised position.

4. A loader for vehicles adapted to be loaded from the ground and from loading platforms comprising a vehicle bed plate having an overhanging rectangular extension from the rear adapted to contact a loading platform, a movable platform attached to said vehicle and adapted to be lowered to the ground, raised to the level of the surface of said extension and folded under said extension when not in use, means on said movable platform for contacting the entire length of the under surface of the outer edge of said extension when said movable platform is in raised position, and means on said movable platform for contacting the entire length of the under surface of the outer edge of said extension when said movable platform is folded under said extension.

5. A loader in accordance with claim 4 in which a portion of the rear of said movable platform contacts the entire length of the under surface of the outer edge of said extension when said movable platform is folded and another portion of said movable platform contacts the under surface of the outer edge of said extension when said movable platform is in raised position.

6. A loader for vehicles adapted to be loaded from the ground and from loading platforms comprising a vehicle bed plate having an overhanging extension from the rear adapted to contact a loading platform, a movable platform attached to said vehicle and adapted to be lowered to the ground, raised to the level of the surface of said extension and folded under said extension when not in use, means on said movable platform for contacting the under surface of the outer edge of said extension when said movable platform is in raised position, means on said movable platform for contacting the under surface of the outer edge of said extension when said movable platform is folded under said extension, said first-mentioned means being the rear portion of said movable platform and said second-mentioned means being a T-bar on the rear of said platform, the edge of bar contacting the under surface of the outer edge of said extension.

7. A loader for vehicles adapted to be loaded from the ground and from loading platforms comprising a vehicle bed plate having an overhanging extension from the rear adapted to contact a loading platform, a movable platform attached to said vehicle and adapted to be lowered to the ground, raised to the level of the surface of said extension and folded under said extension when not in use, means on said movable platform for contacting the under surface of the outer edge of said extension when said movable platform is in raised position, means on said movable platform for contacting the under surface of the outer edge of said extension when said movable platform is folded under said extension, said last-mentioned means being a bar slidable from a forward position under said extension to a rear position under said extension.

8. A loader for vehicles adapted to be loaded from the ground and from loading platforms comprising a vehicle bed plate having an overhanging extension from the rear adapted to contact a loading platform, a movable platform attached to said vehicle and adapted to be lowered to the ground, raised to the level of the surface of said extension and folded under said extension when not in use, means on said movable platform for contacting the under surface of the outer edge of said extension when said movable platform is in raised position, means on said movable platform for contacting the under surface of the outer edge of said extension when said movable platform is folded under said extension, a rotatable member being provided at the rear of said movable platform, said member being positioned between the rear portion of said movable platform and the surface of the outer edge of said extension.

9. A loader for vehicles having a rear bed plate extension comprising a rectangular extension from the bed plate of the vehicle, a movable loading platform adapted to be lowered and to be raised to substantially the level of said bed plate extension and to be folded under said bed plate, and means on the rear portion of said loading platform for contacting the entire length of the under surface of the rear portion of said extension, said being a bar extending transversely of said extension when said loading platform is in raised position, said bar supporting the entire length of the rear portion of said extension when said loading platform is in folded position.

References Cited by the Examiner
UNITED STATES PATENTS

| 2,683,539 | 7/1954 | Corley | 214—77 |
| 2,989,196 | 6/1961 | Lugash | 214—77 |
| 3,138,270 | 6/1964 | McCarty | 214—77 |

GERALD M. FORLENZA, *Primary Examiner.*

ROBERT G. SHERIDAN, *Examiner.*